April 22, 1924.
S. L. BATCHELOR
LEVELING AND ADJUSTING DEVICE
Filed April 13, 1922
1,491,075
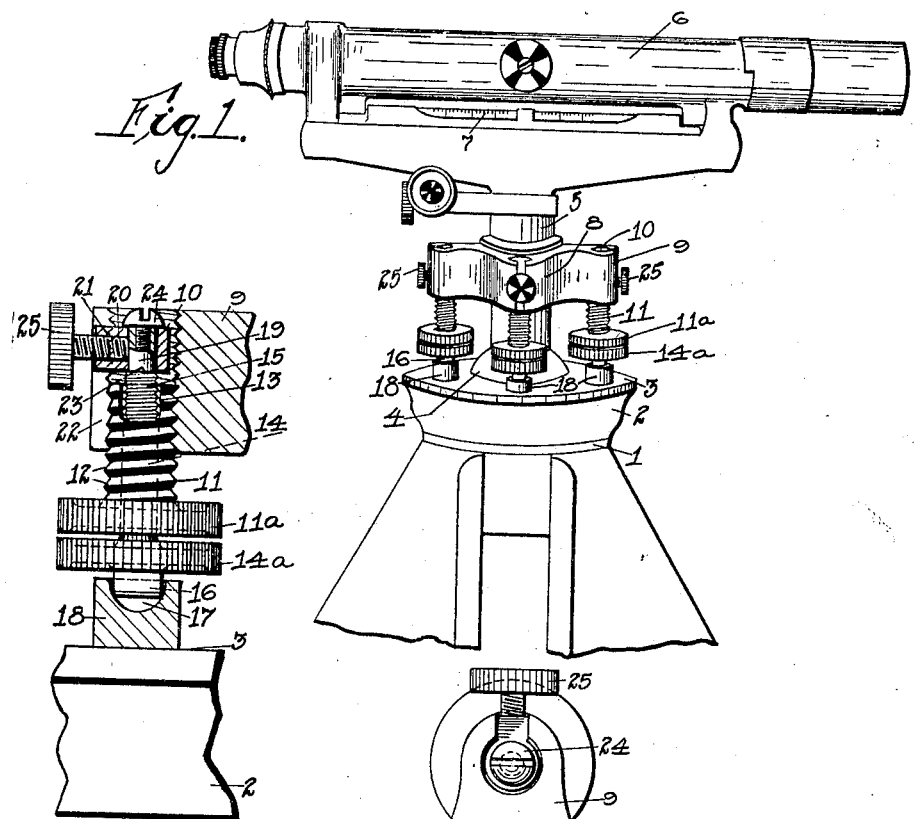
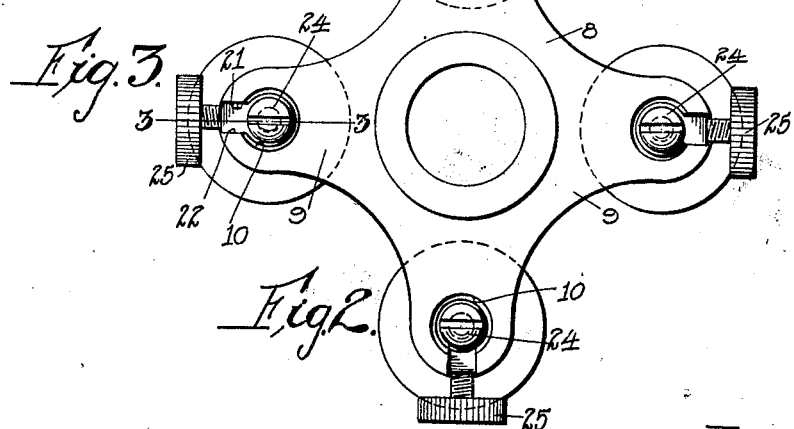
Inventor:
Sanford L. Batchelor
By attorney
Owen W. Kennedy Patented Apr. 22, 1924.

1,491,075

UNITED STATES PATENT OFFICE.

SANFORD L. BATCHELOR, OF GRAFTON, MASSACHUSETTS.

LEVELING AND ADJUSTING DEVICE.

Application filed April 13, 1922. Serial No. 552,279.

*To all whom it may concern:*

Be it known that I, SANFORD L. BATCHELOR, a citizen of the United States, residing at Grafton, in the county of Worcester and Commonwealth of Massachusetts, have invented a new and useful Improvement in a Leveling and Adjusting Device, of which the following, together with the accompanying drawings, is a specification.

My invention relates to a leveling and adjusting device that is particularly adapted to be used in connection with surveying instruments, such as transits, levels, compasses and the like, and has for its object to provide a device whereby any instrument or object used in connection therewith may be quickly brought into a condition of true level from an out-of-level position.

Leveling and adjusting devices of the above described type, as heretofore constructed, have usually employed a number of leveling screws of fine pitch, and while such devices are capable of bringing the instrument to a condition of true level, it frequently happens that the extent of adjustment necessary is sufficiently great to require many rotations of two, or more, of the screws to bring about the desired result. When such adjustments are required at frequent intervals, the total time consumed in making the adjustments, becomes very great, as compared to the time consumed in making readings. Consequently, the work of a number of men employed in making a survey is often held up by the one man who has to bring the instrument to true level before taking a reading. In other words, the progress of the whole surveying party is often determined by the rapidity with which the instrument man can level his instrument.

By the present invention, I propose to provide an improved leveling and adjusting device, whereby the object or instrument to be leveled is first moved from the out-of-level position to a close approximation of the true level position very quickly by means of leveling screws of relatively coarse pitch, after which the completion of the leveling is performed accurately and quickly by means of the differential operation between screws of slightly different lead, all as will hereinafter more fully appear, reference being had to the accompanying drawings in which,—

Fig. 1 is a view in perspective of a portion of a surveyor's instrument, provided with a leveling and adjusting device embodying my invention.

Fig. 2 is a plan view, showing the spider of the instrument shown in Fig. 1, on an enlarged scale.

Fig. 3 is a transverse sectional view along the line 3—3 of Fig. 2.

Like reference characters refer to like parts in the different figures.

While the present invention has a wide field of application, it is of particular value in connection with surveying instruments, such as transits, levels, compasses, and the like, and for convenience of description it has been illustrated as applied to a surveyor's level, without however, in any manner confining the invention to use in connection with any particular instrument.

Referring first to Fig. 1, there is illustrated a tripod head 1 having a nut 2 applied thereto, the top 3 of the nut 2 constituting the base plate of the instrument. The nut 2 is formed with a hollow semi-spherical portion 4 which constitutes one member of a ball and socket joint, the other member of which is carried on a spindle 5, at the upper end of which is mounted an instrument 6. A spirit level 7 is movable with the instrument 6 to indicate the position thereof with respect to a position of true level. The instrument 6 may be of any desired form, since it forms no part of the present invention, and furthermore the instrument 6 may be considered as illustrative of either a transit, level, compass, or any other instrument of like character.

A spider 8 is mounted on the spindle 5 at a suitable point intermediate the ends thereof, and is provided with a plurality of radial arms 9, here shown as four in number, as in Fig. 2. Each arm 9 is provided with a threaded opening 10 within which is received a hollow sleeve 11, provided with a knurled head 11ª and external threads 12 of relatively large lead, such for example, as one eighth of an inch. The longitudinal opening 13 in each sleeve 11 is internally threaded to receive a screw 14, provided with double threads 15 of nearly the same lead as the threads 12, such for example as one ninth of an inch.

The milled head 14ª of each screw 14 is provided at its lower end with a lug 16, slightly rounded at its bottom to fit a similarly rounded recess 17 in a shoe block 18. The upper end of each screw 14 extends through the sleeve 11 and is provided with an unthreaded reduced portion 19, surrounded by a collar 20 which is adapted to fit loosely within the opening 10. The collar 20 is provided with a lug 21 which fits in a slot 22 provided at the end of the arm 9 and communicating with the opening 10. The collar 20 rests on a shoulder 23 formed on the screw 14 at the end of the reduced portion 19, and is held in place by a screw 24. The collar 20 has a threaded opening extending through the lug 21, and a set screw 25 is received therein, whereby the screw 14 may be locked against turning movement for a purpose to be hereinafter described.

Having thus described the various parts entering into my invention, the operation thereof is as follows:—Let it be first assumed that it is desired to set up the instrument in such a location that the tripod head is considerably out of level, as will be indicated by the level 7. The operator first ascertains that the heads 11ª are spaced from the heads 14ª by at least one revolution, and that the set screws 25 are free. The operator then manipulates the heads 11ª and 14ª together, in the customary manner of leveling instruments, one or two turns of the heads 11ª and 14ª, usually being sufficient to bring the instrument into close approximation of a true level condition, as indicated by the level 7. This initial adjustment is carried out very quickly, owing to the coarseness of the threads 12.

Having thus brought the instrument into an approximate level condition, the operator then tightens up on all of the set screws 25 to lock the corresponding screws 14 against rotation. The operator then manipulates only the heads 11ª of the sleeves 11 to obtain the very close adjustment required to bring the instrument to a true level condition. The very fine adjustment obtained by turning a sleeve 11 with its corresponding screw 14 locked against rotation, is due to the differential action between the threads 12 and 15 of a given sleeve and screw, which is as follows:—

When the heads 11ª and 14ª are turned together through one complete revolution, it is obvious, from a consideration of Fig. 3, that the corresponding arm 9 of the spider 8 will be moved a distance equal to the lead of one of the threads 12. If it be assumed that there are eight threads to the inch, then the spider arm 9 will tend to move through 1/8 of one inch for each turn of the corresponding head 11ª. When, however, the inner screw 14 is locked against rotation, as described above, it is obvious that one complete turn of the sleeve 11 will cause the latter to move on the stationary screw 14 a distance equal to the lead of one of the double screw threads 15. If, as it has been assumed, there are nine double threads 15 to the inch, then one revolution of the sleeve 11 on the then stationary screw 14 will cause the whole sleeve 11 to move on the screw 14 a distance of 1/9 of one inch. As a result of these two movements, one due to the turning of the sleeve 11 in the spider arm 9, and the other due to the turning of the sleeve 11 on the screw 14, the spider will be moved relatively to the tripod 1 a distance equal to the difference of the two above described movements which occur simultaneously. In other words, if the screw threads 12 have a lead of 1/8 inch and the screw threads 15 have a lead of 1/9 inch, then the resulting movement of the spider with respect to the tripod head 1 will be the difference between 1/8″ and 1/9″, that is 1/72 of an inch.

From the foregoing then, it is apparent that the instrument can be quickly brought from an out-of-level position to a position of true level by first manipulating the heads 11ª and 14ª together to bring the instrument to an approximate level condition, and then manipulating the sleeves 11 alone, with the screws 14 locked, to obtain the very fine adjustment necessary to bring the instrument to a condition of true level. Obviously, the above described manipulations can be carried out much more quickly than if the instrument were provided with only one set of screws having a relatively small lead, such as 1/32 of an inch.

The advantages obtained by the use of an instrument embodying my invention are particularly apparent in field work, where a surveying instrument, such as a transit or level is frequently set up, the readings taken, after which the instrument is moved to another station. At each new station the leveling must be done again, and with an instrument provided with only the ordinary fine leveling screws, considerable time is consumed to turn the screws sufficiently to bring the parts to a condition of true level. It frequently occurs that the tripod of the instrument must be set considerably out of level, and when the instrument is provided with only fine adjusting screws, it sometimes happens that the screws are turned through the whole range of adjustment without a condition of true level being obtained, whereupon the tripod must be reset, the screws reversed, and the operation of leveling repeated. It is obvious that all of this procedure consumes a great deal of time and necessitates the entire party waiting upon the man operating the instrument.

When however, the instrument is equipped with an adjusting device embodying my invention, there is little or no time lost in bringing the instrument to an approximate level condition, owing to the very quick adjusting movement afforded by the coarse threads on the sleeve 11. Moreover, the instrument man need not exercise any particular care in setting up the tripod to approach as near as possible to a level condition, for the reason that the initial adjustment may be so quickly performed that it does not matter whether the instrument is originally considerably out of level. As a matter of fact, it is better for the tripod to be set sufficiently out of level, so that the instrument man may quickly observe in which direction the parts must be moved to approach the level position. After an approximate level position has once been obtained, it is obvious that manipulation of the sleeves 11 alone, with the screws 14 locked, will quickly bring the instrument to a condition of true level.

From the foregoing, it is apparent that I have provided an improved leveling and adjusting device that is particularly adapted for use in connection with surveying instruments, for bringing such instruments to a condition of true level. While I have shown my invention as applied to a particular type of surveying instrument, nevertheless it is apparent that my invention may be used to advantage for other purposes where frequent leveling is desired, and where the saving of time in reaching a condition of true level is of importance. Therefore, I desire that only such limitations be imposed upon my invention as may come within the scope of the appended claims.

I claim,

1. In a device of the class described, the combination with a support and an object, of a pair of leveling members interposed between the support and the object and provided with screw threads of different lead, and means for operating said leveling members whereby to obtain a movement of said object dependent upon the difference in lead between the threads on said members.

2. In a device of the class described, the combination with a support and an object, of a pair of leveling members interposed between the support and the object and provided with screw threads of different lead, and means for operating said leveling members whereby to obtain a movement of said object with respect to one of said members and a simultaneous movement between said members.

3. In a device of the class described, the combination with a support and an object, of a pair of leveling members interposed between the support and the object and provided with screw threads of different lead, and means for operating said leveling members whereby to obtain a movement of said object with respect to one of said members and a simultaneous movement between said members, the resulting movement of said object with respect to said support being the difference between the above mentioned movements.

4. In a device of the class described, the combination with a support and an object, of a pair of leveling members interposed between the support and the object and provided with screw threads of different lead, and means for holding one of said members against turning, whereby turning of the other member causes movement of said object at a rate dependent upon the difference in lead between the threads on said members.

5. In a device of the class described, the combination with a support, an object, and a pair of leveling members interposed between said support and said object, one of said members being in threaded engagement with a part movable with said object and the other of said members being in threaded engagement with said first named member and resting on said support, of means for locking said second named member against turning.

6. In a device of the class described, the combination with a support, an object, and a pair of leveling members interposed between said support and said object, one of said members being in threaded engagement with a part movable with said object and the other of said members being in threaded engagement with said first named member and resting on said support, of means for locking said second named member against turning, whereby turning of said first named member causes movement of said object at a rate dependent upon the difference in lead between the threads on said members.

7. In a device of the class described, the combination with a support, an object, a leveling member in threaded engagement with a part movable with said object and a second leveling member threaded within said first named member and in engagement with said support, the threads on said members being of different lead, of means for locking said second named member against turning.

8. In a device of the class described, the combination with a support, an object, a leveling member in threaded engagement with a part movable with said object and a second leveling member threaded within said first named member and in engagement with said support, the threads on said members being of different lead, whereby turning of said first named member alone causes a movement of said object dependent upon the difference in lead between the threads on said members.

9. In a device of the class described, the combination with an instrument support providing a plane surface, an instrument movable on said support and provided with a spider and a pair of leveling members, provided with threads of different lead, interposed between said spider and said surface, of means for operating said members to cause a movement of said spider dependent upon the difference in lead between the threads on said members.

10. In a device of the class described, the combination with an instrument support providing a plane surface, an instrument movable on said support and provided with a spider and a pair of leveling members, provided with threads of different lead, interposed between said spider and said surface, of means for operating one of said members with the other locked to cause a movement of said spider dependent upon the difference in lead between the threads on said members.

11. In a device of the class described, the combination with an instrument support providing a plane surface, an instrument movable on said support and provided with a spider, a sleeve in threaded engagement with said spider and a screw threaded within said sleeve, and engaging said surface, of means for locking said screw against turning whereby turning of said sleeve causes a movement of said spider dependent upon the difference in lead between the threads on said sleeve and on said screw.

12. In a device of the class described, the combination with an instrument support providing a plane surface, an instrument movable on said support and provided with a spider having an opening extending therethrough, a sleeve threaded within said opening and a screw threaded within said sleeve and resting on said surface, of a collar surrounding the upper end of said screw within said opening, and means coacting with said collar to lock said screw against turning within said sleeve.

SANFORD L. BATCHELOR.